United States Patent
Goldschmidt et al.

[11] Patent Number: 5,240,787
[45] Date of Patent: Aug. 31, 1993

[54] CELL BATTERY ADAPTER

[75] Inventors: Willfred Goldschmidt, Weston; Stephen K. Jones, Stratford; Richard A. Rowley, Wilton, all of Conn.

[73] Assignee: Duracell Inc., Bethel, Conn.

[21] Appl. No.: 764,603

[22] Filed: Sep. 24, 1991

[51] Int. Cl.⁵ .......................................... H01M 2/10
[52] U.S. Cl. ................................... 429/97; 429/100
[58] Field of Search ................................. 429/97, 100

[56] References Cited

U.S. PATENT DOCUMENTS 3,542,603 5/1968 Simon .................................. 429/87

FOREIGN PATENT DOCUMENTS 53127 5/1967 Fed. Rep. of Germany.

Primary Examiner—Olik Chaudhuri
Assistant Examiner—M. Nuzzolillo
Attorney, Agent, or Firm—Ronald S. Cornell; James B. McVeigh; Barry D. Josephs

[57] ABSTRACT

An adapter for converting multiple electrochemical cells into a desired battery configuration, in particular D size cells into a lantern battery configuration. The adapter is a one piece receptacle structure with a hinged section openable for removal and replacement of spent cells. The adapter further contains a one-piece conductive member, comprised of a substrate with conductive elements, for electrical interconnection of all of the cells with each other and with the external electrical terminals of the adapter. The one-piece conductive member permits the inserted cells to be aligned in a single direction.

11 Claims, 4 Drawing Sheets

CELL BATTERY ADAPTER

This invention relates to battery casings and adapters for electrochemical cells, and particularly to casings for the removable enclosure of cells in a spatial configuration such as a lantern battery.

DESCRIPTION OF THE PRIOR ART

Because of elevated voltage requirements of many electrically powered devices, few applications require the use of a single electrochemical cell. Such applications require more than the common voltage for single cells of about 1.3 to 1.6 volts and oftentimes even more than the 3 volts provided by lithium cells. In many instances, in order to increase the utilizable voltage, individual cells are placed into receptacle enclosures, within the devices, with specifically required orientation of the cells in alternating directions for proper electrical connection. In some instances, devices are powered by batteries of cells, i.e. electrically interconnected cells (usually in series connection for elevated voltage) within separate casings.

In series arrangement, the cells are interconnected in sequential positive-negative terminal connections with ultimate exposure of a negative and a positive end for external electrical connection. This arrangement incrementally, additively raises the voltage. Batteries normally provide voltages in nominal multiples of 1.5 volts/cell (in multiples of 3 volts with lithium cells). Thus, six cells, in series, are required to form the common rectangular 9 volt battery and four cells to form the common 6 volt lantern battery (three and two lithium cells serve to obtain the same nominal voltages respectively).

The cells are permanently fixed into position within such casings and are appropriately electrically interconnected by conductive metal tabs or wires. Most common electrochemical cells are cylindrical and have positive and negative terminals positioned on opposite ends of the cylinder. Conductive tabs or wires appropriately electrically connect such terminals of different cells in forming the battery. External terminals of the battery (often located at one end of the battery), designed for connection with terminals of devices, permit electrical utilization of the battery.

Usually the battery casings are sealed, with the entire battery being discarded (including the casing) when the cells are electrochemically depleted. The common rectangular 9-volt battery and the 6-volt lantern battery are examples of sealed batteries with both positive and negative terminals located at one end of the battery. U.S. Pat. No. 3,661,649 shows a discardable sealed casing of this type for a 9-volt battery, and U.S. Pat. No. 3,660,169 shows a similar discardable 4.5-volt battery. However, since the cells are sealed within these batteries, the entire battery is discarded when depleted, including the casing and external terminals. Some expedients have been used to avoid this wasteful practice, such as disclosed in U.S. Pat. No. 4,806,440, wherein cells are removably disposed in a two piece, separable battery casing. This permits replacement of the spent cells without the necessity of using an entirely new battery.

In addition, some batteries are not generally available in all types of electrochemical systems. For example, 6-volt lantern batteries are commonly available in the less desirable zinc-carbon system as opposed to the higher capacity alkaline or lithium cell systems, though individual cells of the latter are readily found. The use of an openable casing permits adaptation of a battery casing for use with standard cells of a different type.

In the above U.S. Pat. No. 4,806,440 and in others such as U.S. Pat. Nos. 4,407,911 and 4,724,189 where the cells are replaceable, the casings are constructed in two parts, a main receptacle and a detachable cover. Wiring and rewiring of the removable cells is however, not feasible for general commercial use. Accordingly, batteries, as described in the aforementioned patents, are constructed with built-in tab connections in each of the main receptacle and detachable cover. The tabs are short flat strips, usually integrated with the casing, which connect negative and positive terminals of adjacent cells. As a result, the cells are required to be in alternating, up-down position to enable a proper connection to be effected, i.e. for the negative and positive terminals to be proximately adjacent. Alignment of the cells in a single direction, for series cell arrangement in a battery, is not readily possible since this would necessitate numerous lengthy tabs. Furthermore, detachment of a cover would preclude the use of a tab extending from the cover to the main receptacle. Since the user replaces the cells, improper orientation of the cells is common, not readily detected, and results in inoperability of the device.

BRIEF DESCRIPTION OF THE INVENTION

It is an object of the present invention to provide a unitary battery casing with an openable, hinged portion thereof for cell replacement.

It is a further object of the present invention to provide a one piece intercell connector, within the casing, for complete electrical interconnection of multiple cells and particularly more than two cells.

It is a still further object of the present invention to provide such one piece intercell connector which permits the cells to be aligned in a single direction.

These and other objects, features and advantages of the present invention will become more evident from the following discussion and drawings in which:

Figure 1:
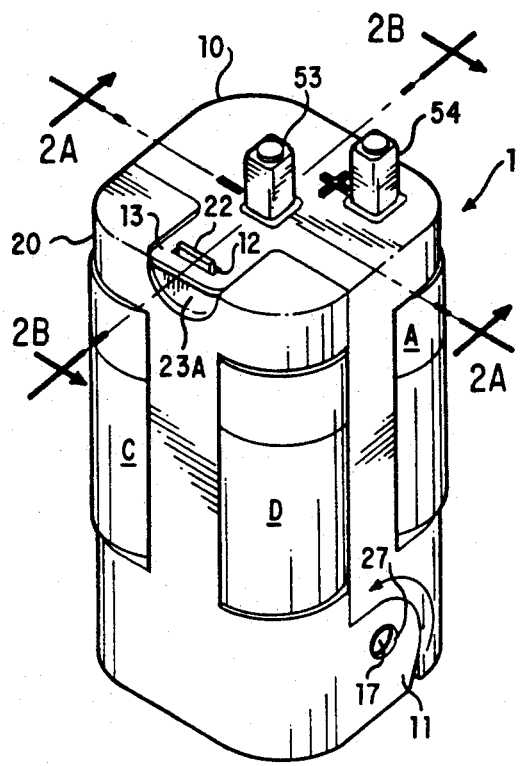
FIG. 1 is an isometric view of the battery casing of the present invention with cells shown in position.

Generally the present invention comprises a battery casing or adaptor having a main receptacle body and an integral hinged closure which permits removal and replacement of electrochemical cells. The hinged closure constitutes a side rather than an end of the casing whereby it is not adjacent the terminal ends of the enclosed cells. The casing is preferably of molded insulative plastic, and configured for the enclosure of four standard "D" size cells (nominal voltage of 6 volts in series) with the casing itself being spatially configured to the shape of a standard 6-volt lantern battery. In such preferred embodiment the casing becomes an adaptor between the contained "D" cells and a lantern which utilizes the battery. The main receptacle body is configured to enclose the terminal ends of the inserted cells.

The casing may desirably be apertured to permit portions of the cells to be externally visible while they are retained therewithin. This not only provides improved aesthetics, but also permits a user to check the orientation of the cells so that it is unlikely that any of the cells will be improperly placed. Means are provided, such as a co-fitting button and an apertured member, between the hinged closure portion and the main receptacle body of the casing, to lock cells therewithin in proper electrical contact position and to prevent accidental removal of the cells from the casing. The hinged closure portion is preferably a separate element which is hingedly attached to the main receptacle body of the casing. In a less desirable embodiment, the hinged closure portion can be integrally molded with the main receptacle body of the casing. In such instance, a thinned section of plastic can serve as the hinge.

The main receptacle body of the casing further contains a separate one-piece electrical intercell connection element for electrically connecting two or more cells within the battery casing. The intercell connection element comprises a substrate having two portions each of which is of sufficient dimensions to span and cover an adjacent group of cell ends. The intercell connection element further comprises a connecting section which physically holds the two portions together as a unit. The intercell connection element is folded into a U-shaped formation for longitudinal insertion within the main receptacle body, with the connecting section being the base of the "U" and closely dimensioned to the length of the inserted cells. Conductive elements such as wires or lines of conductive ink, with appropriate insulation, are positioned on the interior surface of the "U". Exposed tabs or similar conductive areas of the conductive elements are emplaced for engagement with properly positioned cell end terminals.

In a series connected battery, the electrical intercell connection element is positioned within the main receptacle body of the casing; whereby a first portion thereof is compressed between terminals of the contained cells and a first wall or support structure of the main receptacle body of the casing, and a second portion thereof is compressed between the remaining terminals of the contained cells and a second wall or support structure of the main receptacle body of the casing. The section of the intercell connection element extending between the first and second walls or support structures is positioned away from the hinged closure portion of the casing whereby it does not impede insertion or removal of cells from the battery casing. Appropriate electrical interconnection of the cells by the intercell connection element, permits the cells to be arranged in a single direction.

The main receptacle body of the casing further comprises means for fixing the intercell connection element into exact position, whereby exposed contact elements thereof coincide with the terminals of the cells for proper electrical interconnection. One or more tabs on the interior of the main receptacle body of the casing, aligned with cut-outs in the connecting section of the intercell connection element, is a preferred economical means for effecting such relative fixation. Another fixation means, as a supplement to the tab-cutout connection, comprises fold-over retaining members which cooperate with elements of the main receptacle body of the casing to prevent lateral motion.

To ensure that the cells maintain proper electrical contact with the intercell connection element, compression means are provided at one or both of the positions at which the cells contact the electrical intercell connection element. Preferably such compression means comprises a separable plastic spring element cooperatively fastened to the main receptacle body of the casing, and which spring element provides a support for one of the ends of each of the cells.

The intercell connection element preferably comprises an insulative substrate for lines of an electrically conductive material and exposed electrically conductive contact elements along such lines. The contact elements are positioned on the substrate to be touchingly adjacent to the respective positive and negative terminals of all of the electrochemical cells within the battery. The cells are thereby interconnected in a series, parallel or parallel-series arrangement as desired. The intercell connection element further includes separate contact elements for engagement with external terminal members of the battery. Alternatively, the exposed contact elements comprise the external terminal members.

The insulative substrate is preferably a flexible plastic comprised of plastic layers which sandwich lines of the conductive ink which electrically interconnects the cells. At predetermined points along the lines of the conductive ink, small raised buttons of conductive material, such as small metal caps, extend through the plastic at positions whereby they contact the negative and/or positive terminals of the cells. At the electrical terminus leading from the positive and negative terminals of the end cell in the series, exposed electrically conductive material electrically contacts the external terminals of the battery or is itself exposed for electrical contact with the terminals of an external device.

In the 6-volt lantern battery configuration, each of the termini is an exposed conductive material which is compressingly, electrically contacted by a metal spring which is supportingly buttressed by an internal wall of the main receptacle body of the casing. The other end of the spring either directly contacts terminals of the electrical device or engages an elongated cylindrical or rectangular conductive member which in turn engages a terminal of the device.

In another embodiment of the present invention, wires take the place of the conductive ink and the substrate is comprised of a stronger plastic to provide additional support for the wires. Living hinges formed in the plastic substrate permit bending of the substrate into an insertable U-shaped configuration. The casing is additionally appropriately slightly modified to accept this embodiment of the intercell connector. Rivets through the plastic engage the ends of the individual wires to provide for electrical contact with the cell terminals and for external electrical contact with spring loaded terminal members.

DETAILED DESCRIPTION OF THE PREFERRED EMBODIMENT

With specific reference to the drawings, in FIG. 1, four alkaline "D" size cells A, B (not shown in FIG. 1), C and D are positioned in battery casing 1, with the cells all being aligned in the same direction. Battery casing 1 comprises main receptacle 10 and hinged closure portion 20, with the latter being adapted to be swivelled down to permit the cells to be inserted into receptacle 10 or removed therefrom. As shown with the dotted lines in FIG. 2b, the hinged closure portion 20 can be swiveled down via hinge member 11 to permit the cells to be inserted.

In closed position, molded protrusion 22, in recess 23, engages aperture 12 in cantilevered tongue section 13 of receptacle 10. With protrusion 22 inserted within aperture 12, tongue section 13 is seated within recess 23 and the cells are locked within the enclosure formed by main receptacle 10 and closure portion 20 and fixed into position. Depression 23a in closure 20 permits insertion of a thumb to lift tongue section 13 from recess 23, thereby disengaging protrusion 22 from aperture 12 and unlocking the closure 20 from receptacle 10 for removal or insertion of cells. Alternate embodiments using other catch mechanisms are also envisioned.

The hinged attachment between main receptacle 10 and the hinged closure portion 20 is effected by cooperative engagement of circular button protrusions 17 (in depressions 18 of receptacle 10) with circular peripheral apertures 27 in closure 20. The distance between the protrusions 17 is about the same as between apertures 27, whereby the main receptacle 10 and closure member 20 can be snapped together for a positive engagement. The circular configuration of the button protrusions and the cooperative apertures permits a relative rotational hinging as indicated by the arrows.

Figure 2:
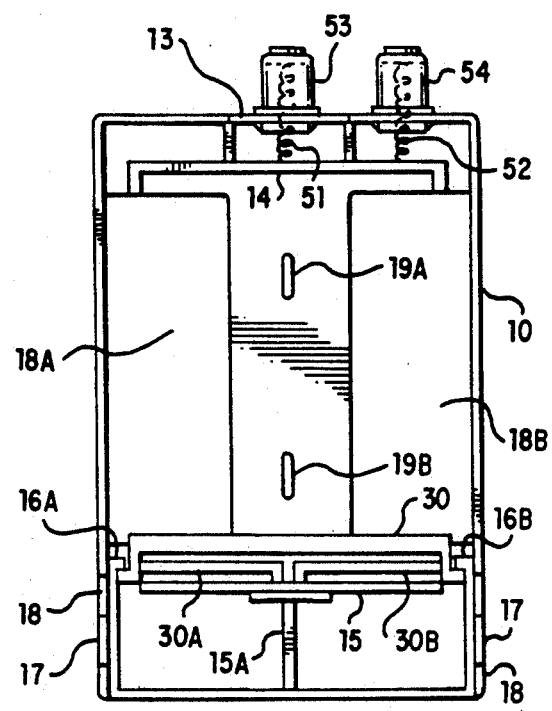
FIG. 2 is a front, inside view of the main body of the battery casing with the cells and the circuit means removed for clarity.
Figure 3:
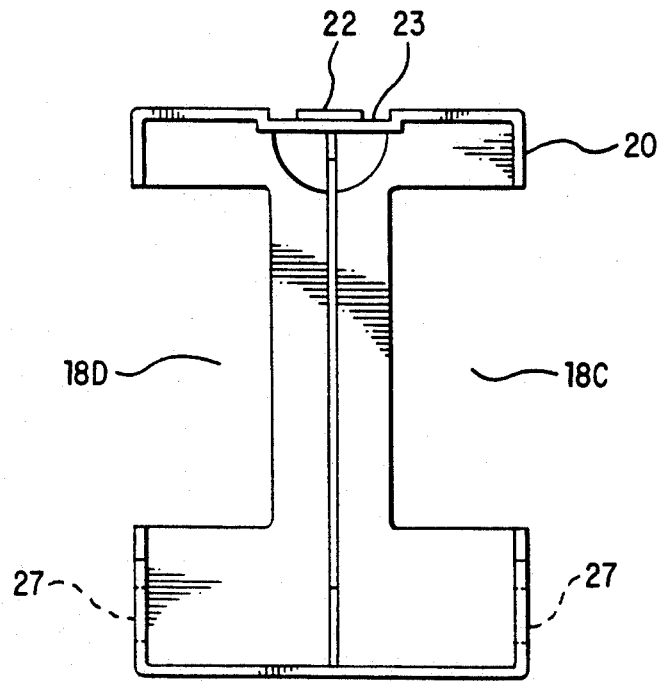
FIG. 3 is a front, inside view of the hinged closure portion removed from the casing.
Figure 2A:
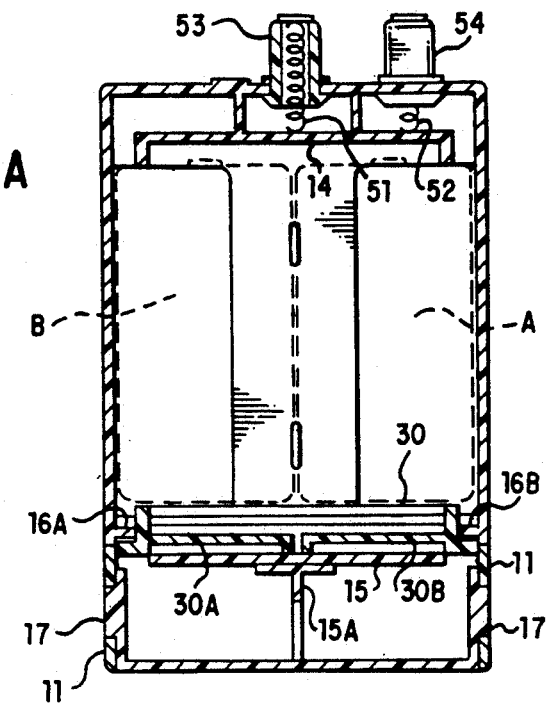
FIG. 2a is a cross-sectional view of the main body of the battery casing taken on line 2a—2a of FIG. 1 and with the cells shown in phantom for clarity.
Figure 2B:
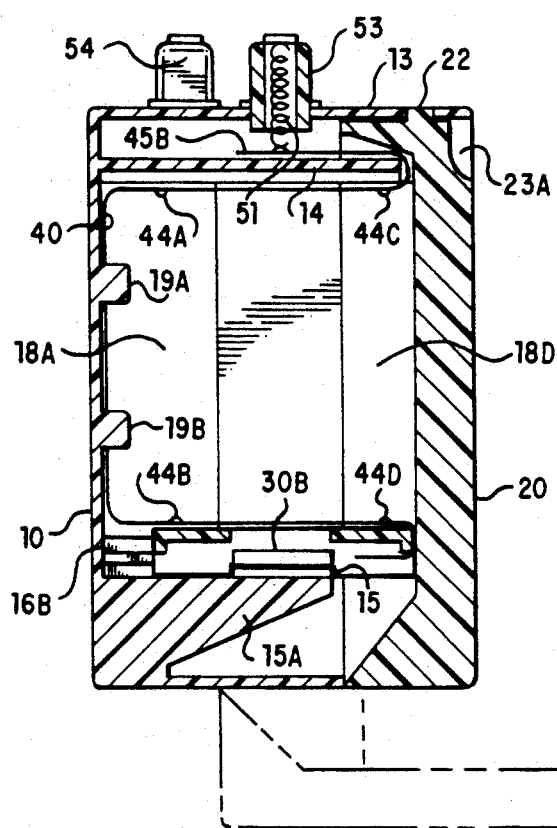
FIG. 2b is a cross-sectional view of the body of the battery casing and the hinged closure taken on line 2b—2b of FIG. 1.

As is more clearly seen in FIG. 2, receptacle 10 has a rectangular, cup-shaped configuration which conforms to that of a standard 6-volt lantern battery. Hinged closure portion 20, shown in FIG. 3, has an I-shaped configuration, whereby it co-operates in conformation with receptacle 10 whereby, with closure portion 20 in the closed position, the battery casing 1 is substantially equivalent in size and shape to the lantern battery. For the aesthetic and practicality purposes described above, receptacle 10 has cut-outs 18a and 18b which reveal cells A and B, and closure portion 20, in which similar cut-outs 18c and 18d are formed (which in turn reveal cells C and D), is releasably locked with receptacle 10.

Figure 5:
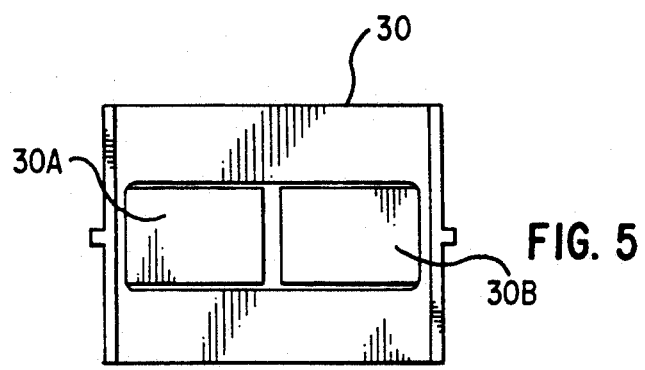
FIG. 5 is a top view of the biasing means used to keep the cells in electrical contact with the interconnecting element of FIG. 4.

Receptacle 10 is molded with a protruding, rectangular buttressing member 14 adjacent its terminal end, and a shelf support member 15 which is spaced a distance about equivalent to the length of a "D" size cell from buttressing member 14. Plastic spring shelf member 30, more clearly shown in FIG. 5, is peripherally fitted beneath railings 16a and 16b which are integrally molded with the walls of receptacle 10. With placement of the spring member 30, cantilevered sections 30a and 30b are thereby directly supported on shelf support member 15 which is integrally secured to bracket 15a. Plastic spring shelf member 30 and buttressing member 14 are about equivalent in size and support four D size cells therebetween. Shelf member 30 and buttressing member 14 are spaced slightly less than the overall length (including positive button terminal) of a "D" cell such that the cantilevered sections 30a and 30b are placed into spring tension by the placement of cells A, B, C, and D.

Figure 4:
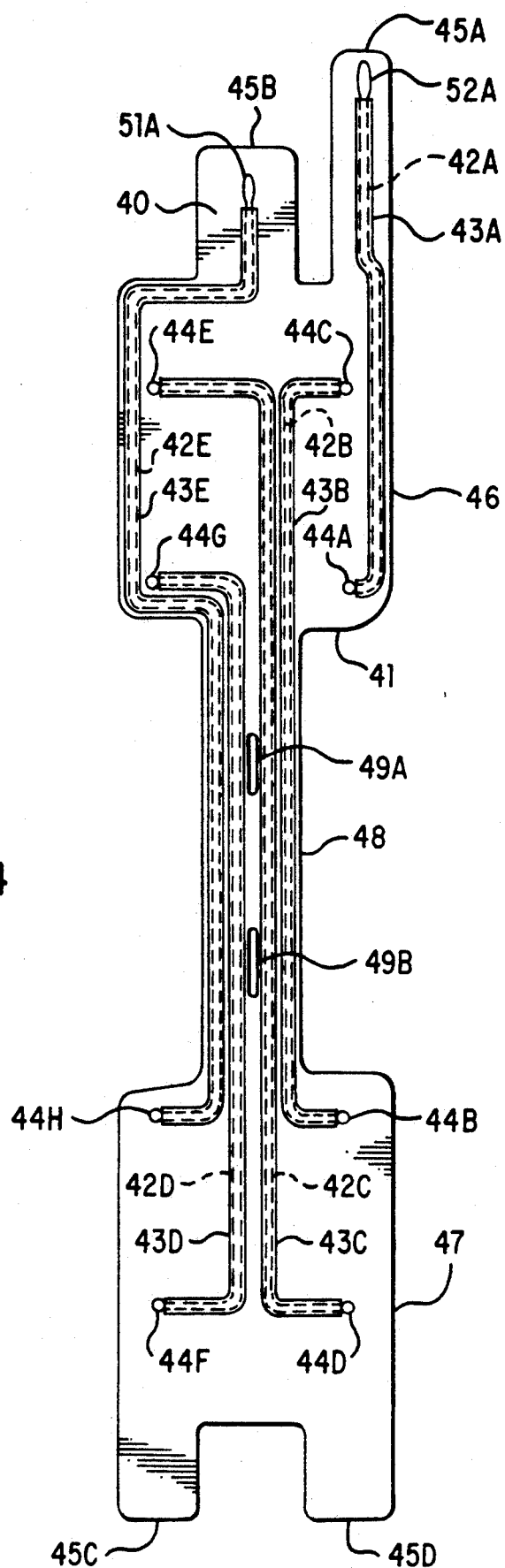
FIG. 4 is an unfolded view of one embodiment of the one-piece cell interconnecting element.

One-piece cell interconnecting element 40, more clearly seen in FIG. 4 in its unfolded form, comprises an insulative plastic substrate 41 onto which conductive ink lines 42 A-E are painted. Insulative plastic strips 43 A-E are placed thereon respectively to insulatively sandwich the conductive ink lines. Conductive raised metal caps 44 A-H are positioned along the conductive ink lines for engagement with the adjacently placed terminals of cells A-D; whereby the cells are electrically interconnected in a series arrangement, even though the cells are all facing in one direction.

As shown, the interconnecting element 40 is folded for placement within receptacle 10 and anchored therein by engagement of tabs 19a and 19b of the receptacle with narrow slots 49a and 49b of the interconnecting element 40 in section 48 thereof. Fingers 45a and 45b are wrapped around the edge of buttressing member 14 and fingers 45c and 45d are wrapped around the edge of plastic spring shelf member 30 to further positively hold the interconnecting element 40 in the appropriate position. When the cells are inserted into the casing 1, the positive terminals of the cells A-D compress section 46 of the interconnecting element 40 against buttressing element 14. The negative terminals of the cells compress section 47 of the interconnecting element 40 against plastic spring shelf member 30. Section 48 of interconnecting element 40 is positioned at the closed end of receptacle 10 where it does not impede insertion or removal of cells.

The conductive, series connection pathway begins at the positive terminal of the battery, metal spring 52 engages exposed, conductive cap 52A, and is connected via conductive line 42A to the positive terminal of cell A through cap 44A. The negative terminal of cell A contacts cap 44B and is connected to the positive terminal of cell D via conductive line 42B and cap 44C. The negative terminal of cell D contacts cap 44D and is connected to the positive terminal of cell C via conductive line 42C and cap 44E. The negative terminal of cell C contacts cap 44F and is connected to the positive terminal of cell B via conductive line 42D and cap 44G. The negative terminal of cell B contacts cap 44H and is connected to metal spring 51 via conductive line 42E and metal cap 51A. Metal spring 51 connects to the negative terminal of the battery.

Metal spring 51 engages rectangular conductive terminal member 53 (FIG. 2b) which extends through and is retained in an aperture in the center of the upper end of receptacle 10. A molded marking indicates that terminal member 53 provides a negative contact. Metal spring 52 engages rectangular conductive terminal member 54 which similarly extends through an aperture at a corner of the upper end of receptacle 10. A molded marking indicates that terminal member 54 provides a positive contact.

Figure 4A:
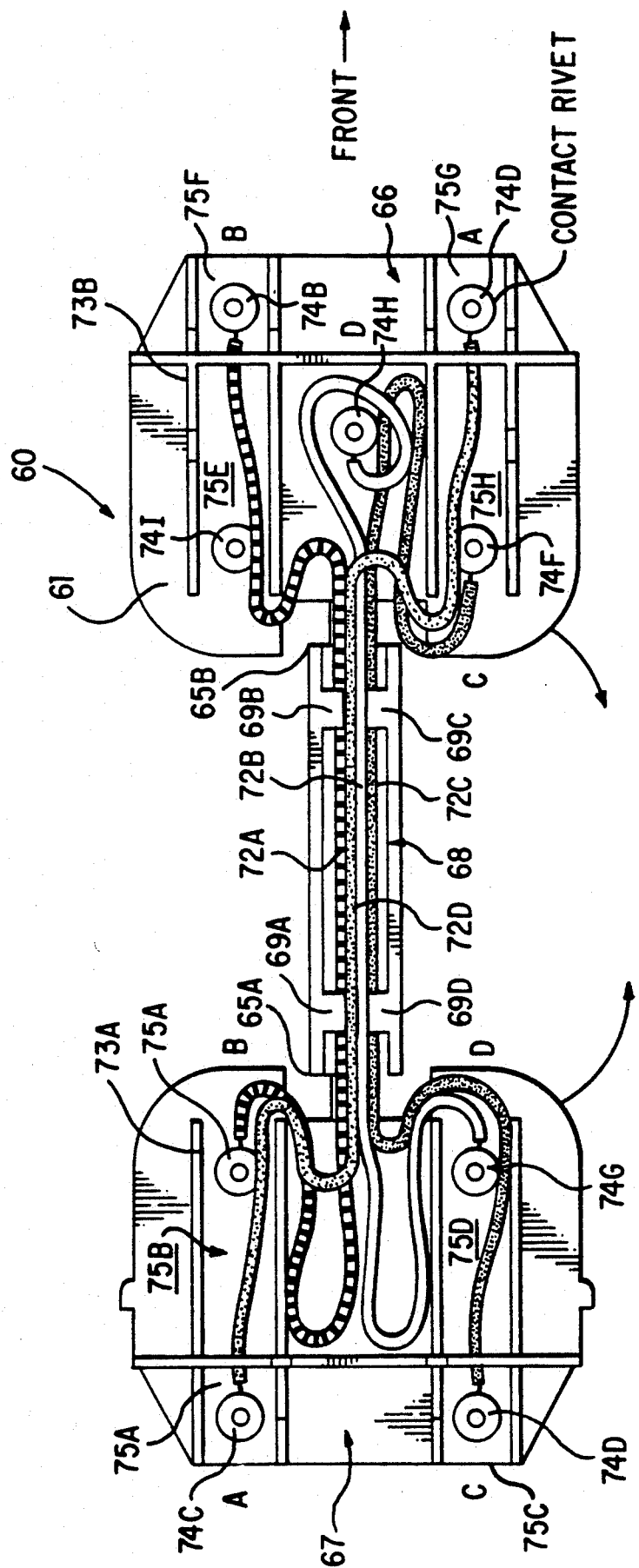
FIG. 4a is an unfolded view of a second embodiment of the one-piece cell interconnecting element.

The alternative one-piece cell interconnecting element or circuit board 60, shown in FIG. 4a in its unfolded form, comprises a relative hard, easy to handle, insulative plastic substrate 61 onto which conductive wires 72A-E are placed. Conductive contact rivets 74A-H are engaged to the ends of the wires for engagement with the adjacently placed terminals of cells A-D. Contact rivet 74I directly engages the end terminal of the last cell in the series, for external terminal engagement. Contact rivets 74H and I extend through the plastic substrate 61 for external electrical contact. Tabs 69A-D partially enclose wires 72A-E and keep them in position relative to the circuit board 60. As shown, the cells are electrically interconnected in a series arrangement, even though the cells are all facing in one direction.

As shown with the arrows, the circuit board 60 is folded along thinned lines 65A and 65B (constituting living hinges) into a U-shape for placement within receptacle 10 shown in FIGS. 1, 2, and 2 A-B in a manner similar to that of the embodiment shown in FIG. 4. Since the plastic substrate 61 has structural integrity it need not be anchored to the extent that interconnecting element 30 is anchored. When the cells are inserted into the casing 1, the positive terminals of the calls A-D compress portion 66 of the circuit board 60 against buttressing element 14. The negative terminals of the cells compress portion 67 of the circuit board 60 against plastic spring shelf member 30. Connecting section 68 of circuit board 60 is positioned at the closed end of receptacle 10 where it does not impede insertion or removal of cells.

When placed within the casing 10, cells A-D are guided into position by raised molded segments 73A and 73B which define eight separate compartments 75A-H for the cell terminals. Following the circuit, as with the interconnecting element 40, the positive terminal of cell B directly contacts rivet 74I which in turn is connected by a metal spring element such as 52 to positive terminal 54 (in this embodiment terminal 54 extends through an aperture in positive terminal buttressing element 14 and is directly above cell B rather than cell A as in FIG. 1). The negative terminal of cell B engages contact rivet 74A which is directly electrically connected by wire 72A to the positive terminal of cell C via contact rivet 74B. The negative terminal of cell C contacts rivet 74C and is connected by wire 72B to the positive terminal of cell D via contact rivet 74D. The negative terminal of cell D contacts rivet 74E and is connected by wire 72C to the positive terminal of cell A via contact rivet 74F. The negative terminal of cell D contacts rivet 74E and is connected by wire 72C to the positive terminal of cell A via contact rivet 74F. The negative terminal of cell A engages contact rivet 74G to wire 72D which extends to contact rivet 74H which in turn engages metal spring element 51 (also extending through an aperture in buttressing element 14) to negative terminal 53.

It is understood that the above example of a battery casing and adapter as illustrated by the drawings is illustrative of the present invention and that changes may be made to the structure, configuration and interconnection of the elements of the battery without departing from the scope of the present invention as defined in the following claims.

What is claimed is:

1. A battery casing for the removable enclosure of a plurality of electrochemical cells, said casing comprising a receptacle for the containment of said cells; with a first portion of said receptacle being hinged to a second portion thereof to permit access for the replacement of the individual cells, and means for releasible securing said hinged portion to the second portion of said receptacle, whereby said cells may be removed or inserted therewithin; wherein said casing includes means for the electrical interconnection of said cells; and wherein said casing further comprises external terminal means for the electrical connection of said battery to an external device, wherein said means for electrical interconnection of said cells comprises a one-piece element comprised of exposed, conductive, contact elements on a non-conductive substrate, said contact elements being adapted for engagement with electrical terminals of said cells, and wherein said contact elements are electrically interconnected with a conductive material to effect a desired interconnection of said cells and a plurality of cells, wherein said desired interconnection comprises a serial interconnection of said cells and wherein all of said cells are aligned in a single direction; wherein each of said cells comprises a cylindrical shape with negative and positive terminals positioned at opposite ends of the cylinder, and when said cells are contained within the receptacle they are longitudinally aligned with adjacent terminals; wherein the non-conductive substrate comprises an elongated strip of plastic of a length equal to the length of the cells and a further length sufficient to overlap all the terminals of the cells; said substrate supporting separate lines of the electrically conductive material, with one of said lines connecting the negative terminal of one cell to the external negative terminal of the battery; and with another of said lines connecting the positive terminal of another cell to the external positive terminal of the battery; and said substrate further supporting additional lines which connect a terminal of one cell to a terminal of another cell, with electrical contact between the line and the cell terminals being effected by said exposed contact elements.

2. A battery casing for the removable enclosure of a plurality of electrochemical cells, said casing comprising a receptacle for the containment of said cells; with a first portion of said receptacle being hinged to a second portion thereof to permit access for the replacement of the individual cells, and means for releasible securing said hinged portion to the second portion of said receptacle, whereby said cells may be removed or inserted therewithin; wherein said casing includes means for the electrical interconnection of said cells; and wherein said casing further comprises external terminal means for the electrical connection of said battery to an external device, wherein said means for electrical interconnection of said cells comprises a one-piece element comprised of exposed, conductive, contact elements on a non-conductive substrate, said contact elements being adapted for engagement with electrical terminals of said cells, and wherein said contact elements are electrically interconnected with a conductive material to effect a desired interconnection of said cells and a plurality of cells, wherein said desired interconnection comprises a serial interconnection of said cells and wherein all of said cells are aligned in a single direction; wherein each of said cells comprises a cylindrical shape with negative and positive terminals positioned at opposite ends of the cylinder and when said cells are contained within the receptacle they are longitudinally aligned with adjacent terminals; wherein the non-conductive substrate comprises a non-conductive plastic substrate having structural integrity, with a first portion thereof overlapping one set of adjacent terminals of said cells and a second portion thereof overlapping the other set of adjacent terminals of said cells with a connecting section therebetween substantially equal to the length of the cells; said connecting section being hingedly attached to each of said first and second portions, whereby said substrate is foldable into a U-shaped configuration for insertion within said casing; said substrate supporting a plurality of separate electrically conductive wires, with each wire contacting a conductive contact element at each of its ends, said contact elements being positioned on said first and second portions for adjacent electrical contact with the terminals of said cells and wherein two of said conductive contact elements are electrically connected to external electrical terminals.

3. The battery casing of claim 1 wherein said strip of plastic is fitted within said receptacle adjacent closed walls thereof, with a portion of said strip being positioned adjacent the length of the cells, when inserted in said receptacle, and wherein end portions of said strip, with said contact elements, are folded to be positioned adjacent the terminal ends of the cells, when inserted in said receptacle; and wherein said battery casing further comprises biasing means for causing the contact elements in the end portions of the plastic strip to be compressed between a wall element of said casing and the terminals of said cells.

4. The battery casing of claim 3 wherein said elongated strip is fixed to the receptacle by fixation means whereby the contact elements are aligned with the proper cell terminal for contact therewith when the cells are retained in said receptacle.

5. The battery casing of claim 4 wherein the cells are interconnected in a series connection and wherein the number of lines supported by said substrate which interconnect said cells and said cells with the external terminals, is one more than the number of cells.

6. The battery casing of claim 4 wherein the conductive lines are comprised of an electrically conductive ink and said contact elements are comprised of raised metal caps.

7. The battery casing of claim 4 wherein said fixation means comprise a raised section of said casing adapted to fit within a slotted retaining section of said plastic strip.

8. The battery casing of claim 7 wherein the fixation means further comprises end segments of the strip which are interfitted within retaining sections of said casing.

9. The battery casing of claim 2 wherein said wires are held in place by tab members on said connecting section.

10. The battery casing of claim 2 wherein the cells are interconnected in a series connection and wherein the number of wires supported by said substrate which interconnect said cells and said cells with the external terminals, is equal to the number of cells.

11. The battery casing of claim 2 wherein said first and second portions comprise molded raised segments which peripherally surround and form compartments for each of said contact elements whereby the terminals of the cells are fixed into contacting position with said contact elements.

* * * * *